United States Patent [19]

Sanderson et al.

[11] 4,372,897

[45] Feb. 8, 1983

[54] DUAL SHEET CAPILLARY HEAT EXCHANGER

[75] Inventors: William G. Sanderson; Richard B. Sumner; Loren G. Kragh, all of Tacoma, Wash.

[73] Assignee: Tower Systems Inc., Tacoma, Wash.

[21] Appl. No.: 254,605

[22] Filed: Apr. 16, 1981

[51] Int. Cl.³ .............................................. B01F 3/04
[52] U.S. Cl. ...................................... 261/153; 165/60; 165/166; 165/DIG. 1; 261/110; 261/112; 261/DIG. 11
[58] Field of Search ............... 261/110, 112, 153, 155, 261/103, 106, DIG. 11, DIG. 77; 165/60, 166, 1, DIG. 1

[56] References Cited

U.S. PATENT DOCUMENTS

| | | | |
|---|---|---|---|
| 1,847,845 | 3/1932 | Mullen | 261/153 X |
| 3,504,738 | 4/1970 | McGuffey | 261/153 X |
| 3,742,681 | 7/1973 | DeSeversky | 261/112 X |
| 3,913,667 | 10/1975 | Meylan et al. | 261/DIG. 11 |
| 3,995,689 | 12/1976 | Cates | 261/155 X |
| 3,997,635 | 12/1976 | Hallgren | 261/112 X |
| 4,014,962 | 3/1977 | Del Notario | 261/112 |
| 4,096,214 | 6/1978 | Percevaut et al. | 261/112 X |
| 4,252,752 | 2/1981 | Flandroy | 261/153 |
| 4,314,605 | 2/1982 | Sumitomo et al. | 165/166 X |

FOREIGN PATENT DOCUMENTS

| | | | |
|---|---|---|---|
| 311863 | 4/1919 | Fed. Rep. of Germany | 261/110 |
| 830573 | 3/1960 | United Kingdom | 261/112 |

Primary Examiner—Richard L. Chiesa
Attorney, Agent, or Firm—Richard W. Hanes

[57] ABSTRACT

Heat transfer and exchange apparatus having a plurality of double-sheeted wettable flow-through pockets suspended from an overhead liquid supplying support in spaced apart and essentially parallel relationship. A downwardly flowing liquid curtain exists within the innerspace of each of the pockets, the liquid curtain bonding the wettable side-forming sheets of each pocket together through cohesive, adhesive and pressure forces. Flow characteristics within the liquid curtain automatically adjust to create a condition of zero pressure differential across each of the wettable sheets which form a pocket pair so that pressure inside and outside the pocket are equal at all unconfined points over the surfaces of the sheets irrespective of flow rate, temperature viscosity, density or composition of the liquid curtain.

The structure includes a compact assembly of interlocking generally wedge-shaped fluid distribution headers and collection manifolds that function as hangers for the pockets and spacers to keep them apart, thus defining relatively wide open spaces for the crossflow of air therebetween. When secondary coolant is flowing down the outside surfaces of each pocket in heat exchange relation with the liquid curtain within the pocket, the heat exchanger is operated as an evaporative cooler. When secondary coolant is not flowing down the outside surfaces of each pocket, the exchanger is operated as an air-liquid indirect sensible heat exchanger.

15 Claims, 17 Drawing Figures

FALLING FILMS

LIQUID CURTAIN

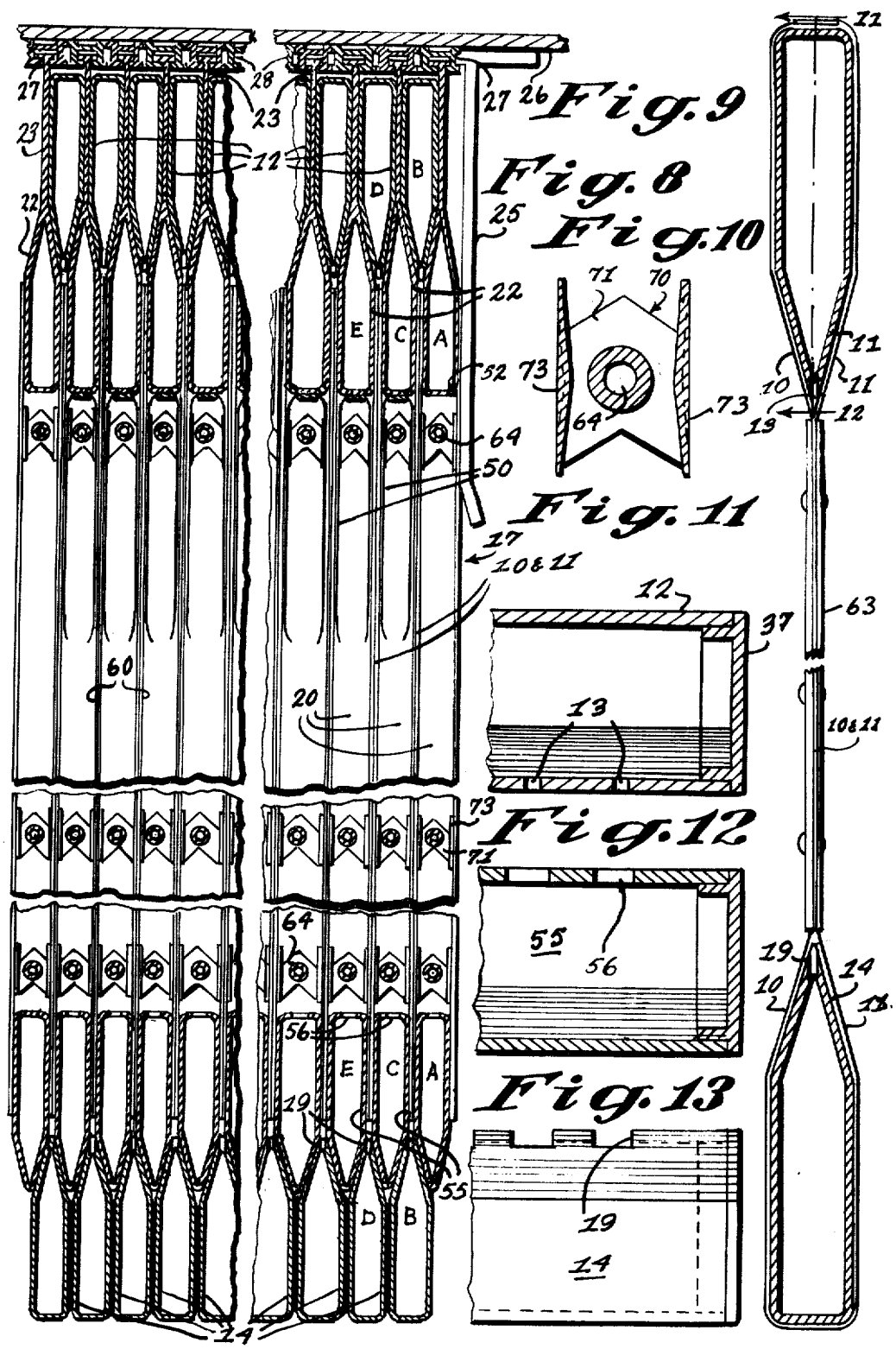

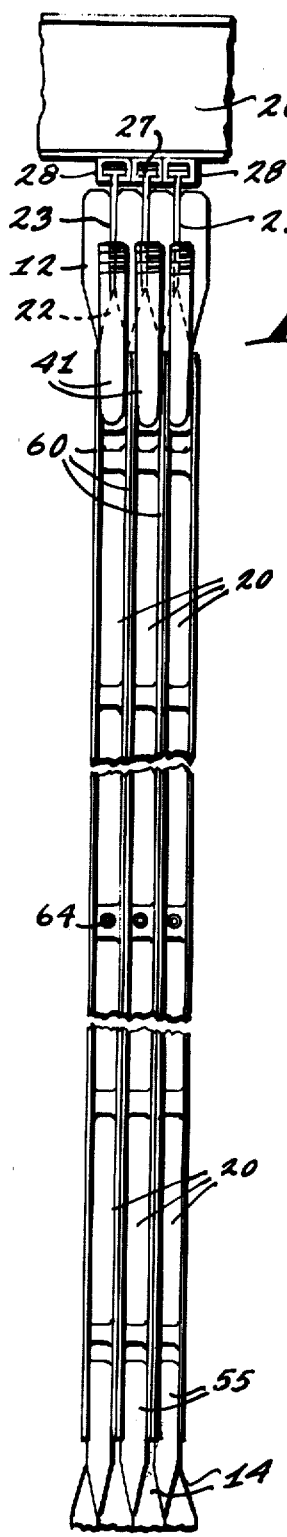
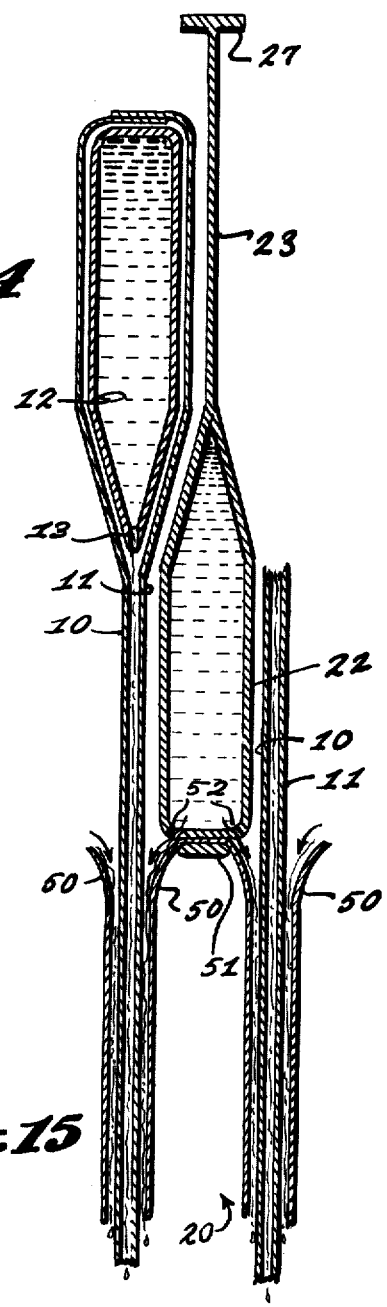
Fig. 14
Fig. 15

DUAL SHEET CAPILLARY HEAT EXCHANGER

BACKGROUND OF THE INVENTION

In a copending application for Letters Patent of the United States filed Aug. 6, 1979, by one of the joint inventors herein and having Ser. No. 063,797, there is disclosed a falling film heat exchanger fabricated from non-metallic heat exchange surfaces having vertically disposed mutually parallel single sheet curtains functioning as heat transfer surfaces and down which a hot liquid gravitates in the form of a film while the heat is being taken therefrom and transferred to a second relatively cooler liquid or gas passing in heat exchange relation thereto on the opposite side of each such curtain. The present invention relates to an improvement of the aforementioned heat exchanger which, among other things, replaces the single-sheet film-carrying curtain with a closely spaced pair of sheets cooperating to define a vertically oriented flow-through pocket in which a curtain of relatively warm liquid gravitates down between the pair of sheets so as to define a fluid coupling therebetween, primarily due to capillary forces.

One disadvantage of the single sheet heat exchange surface, as disclosed in the aforesaid patent application, is the instability of each of the sheets under the influence of air moving over the surface of the sheet. The reduction of pressure caused by the moving air allows the flexible sheet to deform from a flat surface, distorting the air passage and blocking the air flow and sometimes breaking the continuity of the liquid film on the sheet. This problem has been alleviated some by the provision of pressure relief ports and other devices designed to equalize the pressure across the heat exchange surfaces. However, these solutions have not been totally satisfactory, resulting in operating inefficiencies and package density limitations and have led to the discoveries embodied in this invention where the capillary bonded pocket provides self-pressure regulation under the influence of moving air and neither the falling liquid film on the outside of the pocket nor the dynamic air space dimensions is adversely affected.

Confinement of a descending liquid between two wettable sheets in close proximity provides a liquid curtain which is dynamically stable over a very wide range of liquid flow rates. The heat exchanger formed by passing a second liquid over the outside surfaces of the pockets or a gas in close proximity to a plurality of the liquid curtains within the pockets can typically operate over a 20 to 1 ratio of liquid flow rates. This turndown ratio of 20 to 1 compares to a typical turndown capability of 2 to 1 for a normal exposed surface falling liquid film. The heat exchanger can also operate at much lower unit flow rates than a typical exposed surface falling film type. These capabilities are due to the contribution to stability by surface tension forces between the liquid and the two pocket forming sheets in close proximity. The high turndown ratio and the low flow capability make possible a wide range of applications heretofor impractical with a falling film heat exchanger.

The fluid flow characteristics of the liquid curtain within each pocket are such that liquid residence time in the pocket increases and the curtain surface area per total flow increases as the unit flow on a segment of the curtain is decreased (same property as any type of falling film). This, combined with low flow capability, allows heat exchange performance to be comparable to ultra-high surface devices such as conventional cooling towers and modern extended surface heat exchangers. Such performance is far beyond the capability of other falling film heat exchangers.

The physical nature of the water curtain mandates that the thickness of the curtain is exactly defined by the perimeter flow rate and because the confining sheets cannot resist loads in the transverse direction, they conform to the spacing determined by curtain flow theory. Curtain flow theory shows that the curtain thickness will range between 0.01 and 0.03 inches for 95% of all unit flow rates representing practical applications of the heat exchanger. The weight of this very thin curtain can easily be supported by the two sheets and the physical space required by the curtain (cubic feet fluid cavity per square foot of surface) is by far the lowest of any prior art falling film device.

Fluid stability of the water curtain requires that air not be pulled into the space between the wettable sheets at the bottom of the pocket and all that is necessary to satisfy this requirement is that the static pressure at the pocket outlet be infinitesimally less than the static pressure on the surface of the curtain. Under these circumstances the liquid curtain will purge gasses from the pocket and achieve and maintain stability due to the natural forces within the system. Two novel approaches for accomplishing this result are carried out in this invention.

The first approach provides a sealed air space which includes the air space into which the fluid exits from the bottom collection manifolds (i.e., the manifolds collecting the liquid flowing through the pockets) and the downstream plenum into which the air flows from the between-pocket air ducts. This guarantees that the total pressure at the fluid outlet is lower than the total pressure anywhere on the sheet surfaces. (Total pressure is defined as static pressure plus velocity pressure.) The static pressure difference will then be negative or only slightly positive. In most cases the effect of a slightly positive static pressure will be overcome by capillary forces holding the sheets to the water curtain at the curtain flow exit.

The second approach is to exit the fluid into a closed duct or manifold such that the fluid totally fills the duct which is configured in such a manner that the static pressure at the bottom of the pocket is lower than the static pressure on its surfaces. This can be accomplished by exiting the fluid from the duct at a slightly lower elevation than at the bottom of the pocket, allowing the weight of the free-falling water column to produce a negative pressure.

So far as Applicants are presently aware, no prior art teaching exists of a double-sheeted wettable pocket wherein hot liquid flows down between the sheets, holding them apart, and at the same time defining a fluid coupling bridging the gap thus formed. U.S. Pat. No. 3,913,667 details a double-walled flexible curtain made of flexible sheets; however, the space therebetween is such that no liquid film bridge or bond is present and the only fluid connection exists at the bottom where both sheets are immersed in a pool of collected fluid. Moreover, instead of the pressure on the inside and outside of the double-sheeted enclosure being everywhere in equilibrium, as taught herein, the interior pressure is greater than the exterior so as to force the sheets apart and into contact with a restraining grid.

It is, therefore, the principal object of the present invention to provide a heat exchange process which advantageously utilizes a uniquely defined and novel curtain of falling liquid which, because of its peculiar physical properties, is dynamically stable in an environment of moving gas, irrespective of flow rate, temperature, viscosity or fluid density.

A second object of the present invention is to provide a modified falling film heat exchanger characterized by a plurality of suspended flow-through pockets, the confining sheets of which are forced apart and at the same time bonded together by a film of liquid introduced therebetween to maintain an equilibrium condition inside and outside thereof at all points on its unrestrained surface.

An additional object of the within described invention is to provide a modified falling film heat exchanger utilizing flexible membranes for heat exchange surfaces that require no special provision for balancing the pressures thereacross or for special accommodation of diffferent flow rates of coolant.

Another object of the invention is to provide a modified falling film heat exchanger having a possible turndown ratio of 20 to 1 and a capability to operate at low flow rates without adversely affecting the character and stability of the liquid curtain.

Another object of the invention is to provide a heat exchanger that can alternately function as an evaporative cooler or an indirect air-liquid sensible heat exchanger, depending on whether a secondary cooling liquid is flowing.

Still another object is to provide a unique modular system for suspending the pocket forming sheets in mutually-spaced parallel relation inside a framework allowing for the flow of air therebetween as well as the gravity flow of liquid through the interior and down both exterior surfaces of the pockets.

Further objects are to provide a modified falling film heat exchanger which is simple, relatively maintenance-free, easy to service, less expensive than its metal counterparts, efficient, and substantially compact.

Other objectives will be in part apparent and in part pointed out specifically hereinafter in connection with the description of the drawings that follows, and in which.

Figure 6:
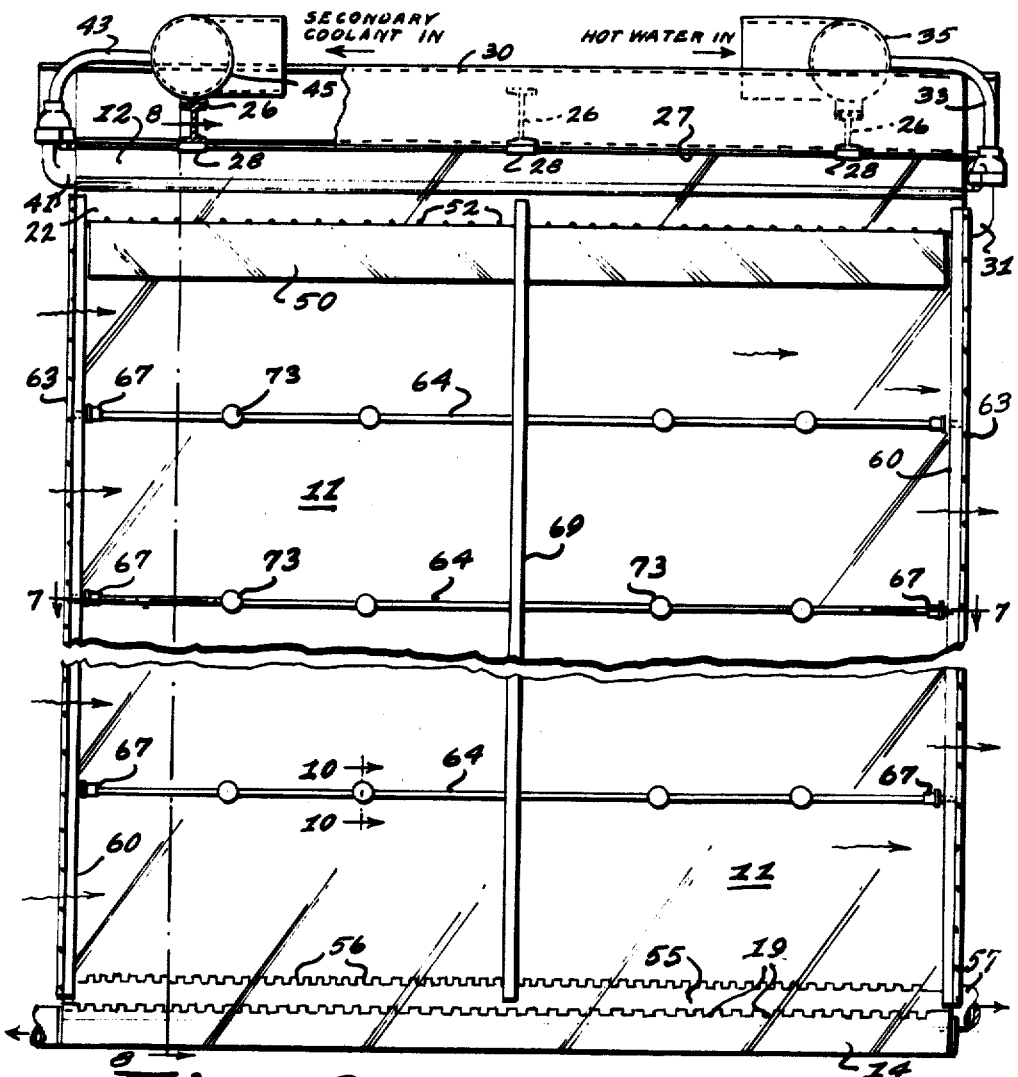

FIG. 6 is substantially a side elevational view of heat transfer module D—D identified in FIG. 8. The view is a cross-section through the supporting structure and then is taken as if dummy header and dummy collector A—A, hot water module B—B and all of the secondary coolant module C—C except the inside dispersion flap (which is cut in cross-section near its attachment point) were removed, exposing to view the "Mylar" wrapped hot water header D, the lower portion of the secondary coolant header E (shown behind the "transparent" pocket depending from header D), the upper portions of the secondary coolant collector E (shown behind the "transparent" pocket depending from header D) and the hot water collector wrapped with the "Mylar", forming the pocket of module D—D.

Figure 7:
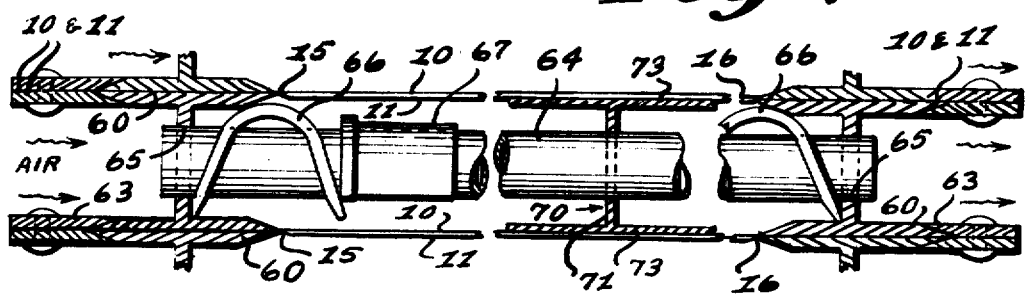

FIG. 7 is a fragmentary cross-sectional view taken along lines 7—7 of FIG. 6.

FIG. 8 is a fragmentary vertical cross-sectional view taken along lines 8—8 of FIG. 6 of a plurality of heat transfer modules.

FIG. 9 is an enlarged fragmentary cross-sectional view of a typical module containing a hot water header and bottom collector tube. The drawing shows a sheet of thin, flexible material wrapped around the header and collector and joined in close proximity between the header and collector to form a liquid-carrying pocket therebetween. The thin plastic material comprising the pocket is shown a distance away from the header and collector for clarity, it being understood that in practice the plastic sheets are in contact with the header and collector outside surfaces.

FIG. 10 is a cross-sectional view taken along lines 10—10 in FIG. 6.

FIG. 11 is a fragmentary vertical cross-sectional view taken along lines 11—11 of FIG. 9 of the closed end of a hot water header.

FIG. 12 is a fragmentary side elevational view of a secondary coolant collector.

FIG. 13 is a fragmentary side elevational view of the closed end of a hot water collector.

FIG. 14 is a fragmentary end view of the top portion of four heat transfer modules of the heat exchanger showing in particular the apertures in the webs of the spacer ladders which provide for air passage through the air ducts between adjoining module pockets.

FIG. 15 is an enlarged fragmentary cross-sectional view of a single hot water header and an adjoining secondary coolant header with the pocket forming sheets and the dispersion flaps shown out of proportion and spaced from their supporting structures for clarity. Arrows show secondary coolant being dispersed over the dispersion flaps and falling as a film down the outside surfaces of the pockets while liquid is filling the pockets from the hot water headers.

Figure 16:
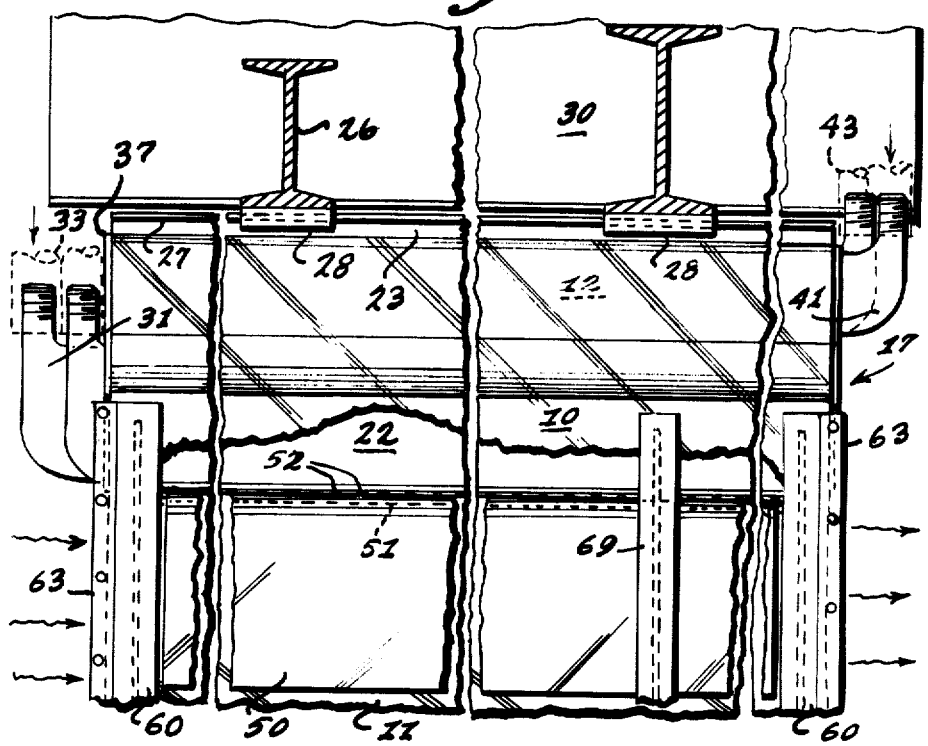

FIG. 16 is a fragmentary enlarged side view of the top portion of two heat transfer modules with the inside pocket sidewall sheet of one module broken away to show the adjoining dispersion flap behind which is seen the outside sidewall of the adjoining module pocket.

Figure 17:
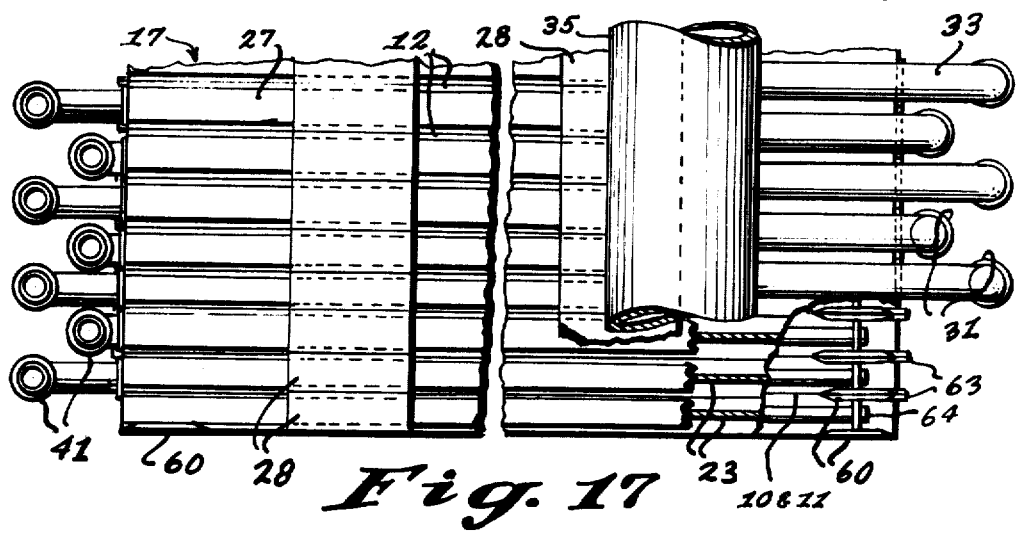

FIG. 17 is a fragmentary top plan view of the heat exchanger with portions broken away and shown in crosssection.

THEORY

Figure 1:
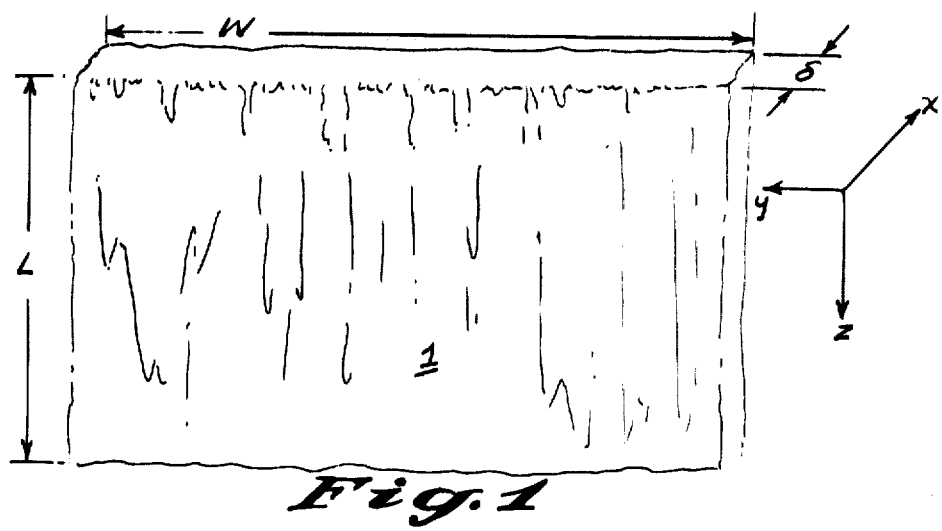
FIG. 1 is a schematic diagram of a typical piece of a curtain of falling liquid of width W, thickness δ and length L, with the Cartesian coordinates x, y and z shown at the side.

Referring to the fragmentary portion of a sheet of falling liquid 1 depicted in FIG. 1 and assuming that the liquid is flowing at a constant mass flow rate $\dot{m}$ (lb./sec), the liquid density $\rho$(lb./ft$^3$) is constant and the volumetric flow $q = \dot{m}/\rho$(ft$^3$/sec) is constant, then the curtain has a uniform thickness δ(ft) all along its width W(ft)

and W is of much larger dimension than $\delta$. If $W/\delta = 200$ to 10,000, then the curtain of liquid has the following constraints:
(1) The flow is uniform along its width. Flow/unit width $\Gamma(\text{lb.}/(\text{ft-sec.})) = \dot{m}/W$ and is therefore constant. Flow is viscous and the flow is uniform along its length L.
(2) The downward liquid velocity (ft/sec) on the surface of the sheet is zero.
(3) The thickness $\delta$ is constant (viscous) flow with out rippling—an accepted approximation for thin film-type flow.
(4.) The static pressure at the surface of the curtain is the same as the surroundings which is uniform over the surface to within 0.5 inches of water pressure.
(5) The curtain is at steady state, i.e., flows and pressures do not vary with time.

If the above constraints exist, the curtain will possess properties which can be used to great advantage in a falling film type of heat exchanger. These advantages will result in a design more compact, with fewer structural elements and with a greater range of operability and application than with prior art devices.

The properties of a fluid in viscous flow with the constraints noted in (1) through (5) above can be rigorously shown using the techniques of classical fluid mechanics as follows:

$$\nabla \cdot \tilde{V} = 0 \tag{A}$$

is the *equation of continuity* when fluid density is constant (all liquids at normal ranges of pressure and temperature) where $\nabla \cdot$ is a vector operator (divergence) and $\tilde{V}$ is the fluid velocity vector which has both a magnitude and a direction at each and every point within the sheet. In cartesian coordinates with x, y, and z mutually perpendicular directions:

$$\nabla \cdot \tilde{V} = 0 = \frac{dV_x}{dx} + \frac{dV_y}{dy} + \frac{dV_z}{dz} \tag{B}$$

where:
($dV_x/dx$) is the rate of change of x component of velocity in the x direction.
($dV_y/dy$) is the rate of change of y component of velocity in the y direction.
($dV_z/dz$) is the rate of change of z component of velocity in the z direction.
and:
($dV_y/dy$) = 0 (Constraint (1), uniformity)
($dV_z/dz$) = 0 (Constraint (1), uniformity)
($dV_x/dx$) = 0 (Equation B).

The general form of the *equation of motion* for a neutonian fluid (constant viscosity ($\mu$) at a given state) when $\nabla \cdot \tilde{V} = 0$ is:

$$\rho \frac{d\tilde{V}}{dt} = -\nabla p + \mu \nabla^2 \tilde{V} + \rho \tilde{g} \tag{C}$$

Where $\rho$ is the fluid density (lb./ft$^3$), a scaler constant;
($d\tilde{V}/dt$) is the time rate of change of the vector V along the path fluid motion, an acceleration term.
$\nabla p$ is the gradient of the scaler quantity p, where p is the pressure.
$\mu$ is the fluid viscosity (lb./(ft.-sec.))
$\nabla^2 \tilde{V}$ is the laplacian of the vector V.

$\tilde{g}$ is the gravity acceleration vector.
The algebraic form of the equation of motion in the z direction (vertical) is:

$$\rho \left( \frac{dV_z}{dt} + V_x \frac{dV_x}{dx} + V_y \frac{dV_y}{dy} + V_z \frac{dV_z}{dz} \right) = \tag{D}$$

$$-\frac{dp}{dz} + \mu \left( \frac{d^2V_z}{dx^2} + \frac{dV_z}{dy^2} + \frac{d^2V_z}{dz^2} \right) + \rho g_z$$

Applying the constraints:
($dV_z/dt$) = 0 = rate of change of the z component of velocity as a function of time. (Constraint (5)—steady state)
$V_x$ = 0 = Velocity component in the x direction. (Constraint (3)—viscous flow without rippling)
$V_y$ = 0 = Velocity component in the y direction. (Constraint (1)—flow uniformity along the y direction)
($dV_z/dz$) = 0 = rate of change of velocity component in the z direction with respect to z. (equation of continuity);
($dp/dz$) $\approx$ 0 = rate of change of pressure in the z direction. (Constraint (4))
($d^2V_z/dz^2$) = ($d^2V_z/dy^2$) = 0 = The acceleration of the z component of velocity along z and along y. (Constraint (1) and equation of continuity).

With the above constraints, equation (D) becomes:

$$\mu \left( \frac{d^2V_z}{dx^2} \right) + \rho g_z = 0 \tag{E}$$

Equation (E) shows that only two forces can be exerted on the system to produce the desired liquid curtain and these forces are equal and everywhere in balance. These forces are:
(a) Gravity forces due to the weight of the falling liquid; and
(b) Shear forces resisting flow applied uniformly to the surfaces of the curtain.
Pressure forces in the z direction cannot be transmitted because of Constraint (4).

Since $g_z \neq f(x)$, the general solution of (E) becomes:

$$V_z = A + Bx - \frac{\rho}{2\mu} g_z x^2 \tag{F}$$

Figure 2:
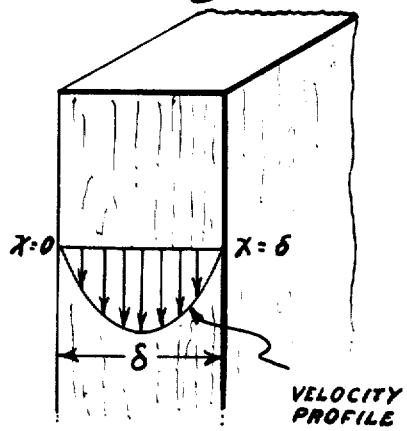
FIG. 2 is a schematic cross-sectional diagram of a curtain of falling liquid of thickness δ, showing the parabolic velocity profile of the liquid.
Figure 3:
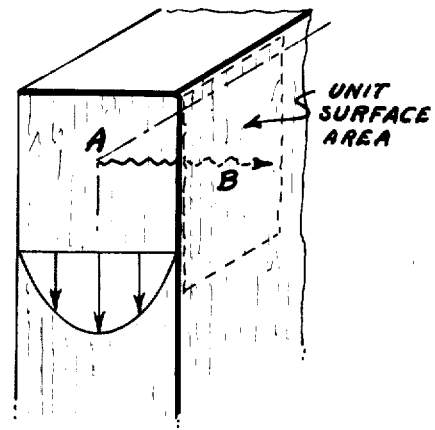
FIG. 3 is a schematic cross-sectional diagram showing the parabolic velocity profile curve of the liquid and demonstrating with the crooked arrow the transfer of heat energy from the center A of the curtain to a point B on the outside surface area of the liquid curtain.

Applying the boundary conditions:
at $x = 0$ and $V_z = 0$, $A = 0$
at $x = \delta$ and $V_z = 0$, $B\delta = (\rho g_z \delta^2 / 2\mu)$
Solving for B, B = $(\rho g_z \delta / 2\mu)$ and substituting in equation (F), then:

$$V_z = \frac{\rho g_z}{2\mu} (\delta x - x^2) \tag{G}$$

and the flow is shown to be parabolic (See FIG. 2).
The average downward velocity $V_z$ of the fluid is:

$$\overline{V_z} = \frac{\int_0^\delta V_z \, dx}{\delta} = \frac{\rho g_z \delta^2}{12\mu} \tag{H}$$

Since the perimeter flow $\Gamma = \rho \delta \overline{V_z}$ and substituting for $\overline{V_z}$:

$$\Gamma = \frac{\rho^2 g_z \delta^3}{12\mu}$$

and solving for δ, the film thickness becomes:

$$\delta = \sqrt[3]{\frac{12\mu\,\Gamma}{\rho^2 g_z}} \quad (I)$$

(I)
Equation (I) is the equation which will be used to show the unique and useful properties of the curtain described. It shows that the liquid curtain has properties similar to a falling film of liquid adhering to a surface. The equation for a falling film adhering to a surface is:

$$\delta = \sqrt[3]{\frac{3\mu\,\Gamma}{\rho^2 g_z}} \quad (J)$$

Figure 4:
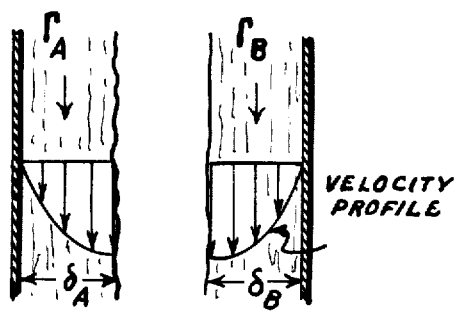
FIG. 4 is a fragmentary cross-sectional diagram of two opposed falling films adhering to supporting sheets. The velocity profiles of each of the falling films is one-half of a parabola.
Figure 5:
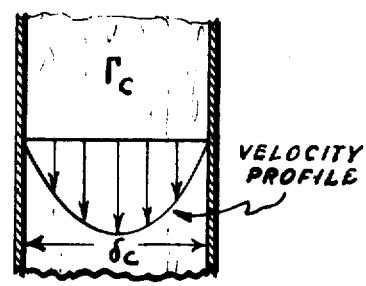
FIG. 5 is a cross-sectional diagram with a parabolic velocity profile curve of liquid falling between two closely related sheets, filling the space therebetween and wetting the sheets, bonding them together to form a liquid curtain.

(J)
This equation applies for streamline viscous flow with and without ripples up to a Reynolds number of 1500. Above a Reynolds number of 1500, flow becomes turbulent and the velocity increases and film thickness decreases over that predicted by equation (J). FIGS. 4 and 5 show the similarity between a falling film and the water curtain. The Reynolds number as used herein defines equivalent flow situations. It is defined as follows:

$$R_e = \frac{4R_H \rho \bar{V}}{\mu}$$

where $R_H$ = HYDRAULIC RADIUS.

In FIG. 4, depicting falling films:

$$R_H = \delta$$

$$R_e = \frac{4\delta\rho\bar{V}_z}{\mu} = \frac{4\Gamma}{\mu}$$

$$\delta_A = \sqrt[3]{\frac{3\mu\,\Gamma_A}{\rho^2 g_z}}$$

$$\delta_B = \sqrt[3]{\frac{3\mu\,\Gamma_B}{\rho^2 g_z}}$$

In FIG. 5, depicting the liquid curtain of the present invention:

$$R_H = \frac{\delta}{2}$$

$$R_e = \frac{2\delta\rho\bar{V}_z}{\mu} = \frac{2\Gamma}{\mu}$$

$$\delta_c = \sqrt[3]{\frac{12\mu\,\Gamma_c}{\rho^2 g_z}}$$

Solving the equations for the falling film and the liquid curtain at equivalent Reynolds numbers of 1500:

| Falling Film | Water Column |
|---|---|
| $\Gamma_A = \Gamma_B = \frac{1500\mu}{4}$ | $\Gamma_c = \frac{1500\mu}{2} = 2\Gamma_A$ |
| $\delta_A = \sqrt[3]{\frac{3\mu\,\Gamma_A}{\rho^2 g_z}}$ | $\delta_c = \sqrt[3]{\frac{12\mu\,(2\Gamma_A)}{\rho^2 g_z}}$ |
| | $= 2\sqrt[3]{\frac{3\mu\,\Gamma_A}{\rho^2 g_z}} = 2\delta_A$ |

Thus, at equivalent flow conditions, it is demonstrated that the liquid flow of the curtain is twice the liquid flow of the falling film and its thickness is twice that of the falling film. Two falling films opposed to each other are identical to the defined liquid curtain.

In a heat exchanger application, a typical liquid curtain would have a perimeter flow rate of 0.02 to 0.25 lb./(ft.-sec.). If the liquid is water at 100° F. the viscosity $\mu = 5.04(10^{-4})$ lb./(ft.-sec.) and the Reynolds number would be in the range of 80 to 1000, which means the flow is viscous and equation (I) applies. The film thickness over this range is tabulated:

| Perimeter Flow (lb./(ft.-sec.)) | Film Thickness (inches) |
|---|---|
| .02 | 0.012 |
| .25 | 0.028 |

The thickness is noted to be a very small dimension. If the curtain is 8 feet wide, then the dimension W/δ ranges between 3400 and 8000, verifying the original assumption for W/δ.

As seen in FIG. 4, the heat transfer rate Q from the center A of flow in the curtain to the surface B when the flow is viscous is by conduction, that is there are no convective eddys.

$$Q = \frac{KA\,\Delta t}{\delta/2}$$

Where:
Q is the heat transfer rate in BTU/hr;
K is the liquid thermal conductivity;
A is the area across which heat is transferred in square feet.
Δt is the temperature difference between the center of the film and the surface in degrees Fahrenheit.

The quantity K/(δ/2) is the film coefficient or h. The thermal conductivity of water at 100° F. is 0.362 BTU/(ft.-hr.-°F.). The film coefficients are 310 and 710 BTU/hr/ft²/°F. for film thickness of 0.028 and 0.012 inches respectively. The effective film coefficients are even higher because all heat transferred to the surface does not come from the center. The film coefficient is equivalent to the reciprocal of resistance. High values mean low resistance. When the water curtain is used in a heat exchange application in a system where ultimate heat rejection is to an air stream, effective air film coefficients range from 30 to 5 BTU/(hr.-ft.²-°F.), depending on whether or not evaporative cooling is present.

These air resistances to heat transfer are 10 to 60 times greater than the resistance through the water curtain.

Viscous (non-turbulant) flow conditions are normally unfavorable for heat transfer but as is shown in the previous example, heat flow resistance in the curtain is not significant because of its thickness. A water curtain in an air-water device, such as a cooling tower, would have to cool typically 20° F. from top to bottom. Assuming a curtain 15 feet long with a perimeter flow of 0.25 lb./(ft.-sec.), then h would be 310 BTU/(hr.-ft.$^2$-°F.).

In the worst case of highest perimeter flow and maximum curtain thickness, the bulk temperature of the water curtain is about 1° F. warmer than the surface temperature of the curtain. Thus, the curtain is thermally efficient for cooling tower applications.

Another advantage of the liquid curtain defined herein is the long and positively controlled residence time of the fluid in the curtain. In a typical air-water contact device such as a cooling tower, water free falls through a contact zone and the amount of cooling is dependent on the contact time. Thus, to increase cooling, the distance through which the water falls must be increased and towers with difficult cooling problems must be very tall, increasing pumping requirements. Using the water curtain described herein, the amount of cooling which can be accomplished is related only to perimeter flow rate. The following is an example of a water curtain 15 feet long at two extremes of perimeter flow.

| Perimeter Flow (lb./(ft.-sec.)) | Average Water Velocity (ft/sec) | Residence Time (sec.) |
|---|---|---|
| 0.02 | 0.325 | 46 sec. |
| 0.25 | 1.75 | 8.6 sec. |

Thus, the amount of cooling which can occur in the described water curtain at a fixed height is equal to a standard cooling tower having a height ratio of 6/1 over the height of the liquid curtain.

DETAILED DESCRIPTION

According to the present invention a liquid curtain having the described characteristics is produced by introducing the liquid to be cooled between a pair of closely spaced sheets of a non-metallic substance such as "Mylar". The sheets are vertically oriented and are sealed along their vertical side edges forming a bag or pocket whose sides define the lateral boundries or surfaces of the liquid curtain. The liquid flowing into the top of the pocket wets both inside surfaces of the sheets simultaneously and is pulled by surface tension to the edges of each sheet as long as the initial pressure inside the pocket is not significantly greater than that on the outside surfaces, as previously explained. The liquid curtain formed inside the two parallel sheets stabilizes to a condition where the flow is uniform and constant in the y and z directions because there are no significant viscous forces at the far edges of the curtain to produce a velocity profile in the y direction and further because the flexible wettable sheets are not under stress and all pressures are transferred to the liquid curtain preventing the curtain from producing a pressure drop along its flow length. It is well known in fluid mechanics that the water velocity at the exact point of contact to a solid it wets is zero. Thus, the two free-hanging wettable sheets in close parallel proximity set up the major constraints previously noted and the liquid curtain is formed.

Having now had the opportunity to understand the character and formation of the liquid curtain, a better understanding may be had of two important previously mentioned factors which advantageously distinguish over the prior art falling film heat exchange devices.

The first concerns the spreading characteristic of the liquid curtain. Because of the fact that in the liquid curtain the net force generated by the surface tension is parallel to the surface boundry of the curtain and directed toward the outer extremities the liquid spreads itself throughout the pocket, pushing out entrapped air as it spreads. To the contrary, the net force of surface tension in a liquid of a traditional falling film tends to oppose the wetting action and external forces such as pressure nozzles or a uniform wick is required to obtain even spreading of the liquid on the supporting surface.

The second concerns the pressure equalization perpendicularly across the sheets in the presence of an air stream moving over the surface of the sheets. In the falling film device of the aforementioned co-pending patent application, there will always be a pressure drop perpendicularly across the sheet supporting the film, causing substantial stress and bowing in the sheet, reducing heat exchange performance. The liquid curtain has none of these limitations because the liquid in the curtain assumes the same pressure as the air stream. Small variations in the air stream pressure from point to point over the outside surfaces of the sheets are duplicated within the liquid curtain by infinitesimal liquid flows superimposed over the computed liquid curtain profile in the direction of the surface pressure change. The flows are exactly of sufficient magnitude to duplicate the external pressure change through viscous drag losses and gravity effects of free fall or holdup. Thus, it is seen that there are no pressure loads which must be resisted by the wettable sheets due to pressure differences between the air stream and the coolant compartment.

Reference is now made to FIG. 9 which illustrates, in cross section, the construction of a single flow-through pocket adapted to carry the hot water, or other liquid, which is intended to be cooled. The pocket is formed by a pair of facing sheets 10 and 11 of 0.003-inch thick "Mylar". The sheets 10 and 11 are constructed from one continuous piece of "Mylar" sheet which is first wrapped around the top and one side of a wedge-shaped, hollow hot water header 12, then draped from the sharp bottom edge of the header 12, wrapped completely around the wedge-shaped, hollow hot water collector 14, extended upwardly in juxtaposition to the draped part of the sheet and wrapped around the other side of the hot water header 12 and cemented to the beginning edge of the sheet on the top of the header to form an enclosure of the flexible material. The vertical side edges of the sheets 10 and 11, between the lower edge of the header 12 and the upper sharp edge of the collector 14, are sealed by a continuous weld strip binding the two sheets 10 and 11 just inside the clips 63, at points 15 and 16 (seen in FIG. 7), forming a completely enclosed pocket between the header 12 and the collector 14.

As shown in FIG. 8, the heat exchanger 17 is constructed by suspending a plurality of the pockets in mutually parallel spaced apart relationship. The spaces 20 between each adjoining pocket act as ducts for the horizontal flow of air to cool the liquid which forms the falling curtain between the sheets 10 and 11. As already explained in the theory section of this specification, the moving air has no effect on the suspended sheets because the liquid curtain creates a condition of zero pressure differential across each of the sheets 10 and 11.

Hot water enters the hot water headers 12 through entry nozzles 31 which are plugged into the open end of each header 12. The nozzles 31 are connected by appropriate piping 33 to a hot water manifold pipe 35 which brings the hot water from any source where the water is required to be cooled, such as the service water from a steam turbine electrical generating plant. The other ends of the headers 12 are closed by caps 37. From each header 12 the hot water exits through a number of holes 13 in the bottom sharp edge of each header 12 into the space between the sheets 10 and 11. After the water has been dispersed downwardly, as a liquid curtain between the sheets 10 and 11 of each heat transfer module it is collected through apertures 19 in the water collectors 14 and returned, in cooled condition, to the service system from which it came, not having been subject to evaporation or mixing with any other liquid during the cooling process.

Although the structure could be virtually complete by suspending the water conducting pockets in side-by-side relation and passing air between them, as explained above to create dry cooling, it has been found that heat exchanger operations can be enhanced by introducing a secondary coolant which circulates through a second fluid loop entirely separate and isolated from the hot water being manifolded into the pockets. A more detailed explanation of the double circuit cooling tower is disclosed in U.S. Pat. No. 4,299,786, entitled "Waste Heat Disposal Process". Without burdening this description with the details of the double water circuit system, it can be said that certain heat exchange advantages occur by passing a secondary coolant down the outside surfaces of the sheets 10 and 11 as an ordinary falling film. Sensible heat is transferred from the hot water within each pocket to the secondary coolant and evaporative cooling of the secondary coolant takes place through direct contact between the secondary coolant and the air flowing through the ducts 20.

Dispersing the secondary coolant to the outside surfaces of each of the pocket forming sheets 10 and 11 leads to the novel sandwich construction of the heat exchanger 17 wherein wedge-shaped secondary coolant headers 22 are inverted and held together by a frame 25 in side-by-side relation and nested into the V-shaped openings between the hot water headers 12. Only one-half of the frame 25 is shown in FIG. 8, it being understood that a similar frame member exists on the opposing side to form the constraining side elements of the sandwich. The frame elements 25 are carried by crosswise supporting beams 26.

Vertical support of each secondary coolant header 22 is provided by a vertically disposed web 23 integral with the side wall construction of the fluid carrying header 22. The web 23 is topped along its length with a "T" cross member 27 which is supported by a channel member 28. (Best seen in FIG. 14) The series of the channel members 28, which each support one secondary coolant header 22, are carried by the beams 26 which form part of an overall rigid overhead supporting structure 30 for the entire heat exchanger 17.

Secondary coolant liquid enters each secondary coolant header 22 through an entry nozzle 41 which is plugged into the open end of each header 22. Each nozzle 41 is connected by appropriate piping 43 to a secondary coolant manifold pipe 45 which is connected to a source of liquid (not shown). The other ends of the headers 22 are closed by caps 47.

To evenly dispense the secondary coolant from the headers 22 to the outside surfaces of the pocket sheets 10 and 11 so that the secondary coolant covers the sheets as a film, a flexible thin plastic flap 50 is provided as a fluid conveyance. Referring specifically to FIGS. 6, 8 and 15, it is seen that a piece of flexible material, such as "Mylar", of rectangular shape and having the same length as the secondary coolant header 22 is attached along its longitudinal center line to the bottom flat side of the header 22 with fasteners 51 so that it drapes freely from each side of the fastening line. A series of apertures 52 are provided in the bottom flat side of the header 22 to allow the escape of secondary coolant. As the coolant leaves the header, it forms a film over the flaps 50 and, because the depending flaps are positioned in close proximity to the sheets 10 and 11 of adjoining pockets, the coolant is transferred evenly to the pocket sheets to fall down the outside surfaces of the sheets, absorbing heat energy from the hot water within the pockets across the thin sheets 10 and 11 separating the two liquids. The secondary coolant is collected at the bottom of each between-pocket space by an inverted wedge-shaped collector tube 55, similar in construction to the hot water collectors 14. Each of the coolant collectors 55 is provided with apertures 56 in the flat upper face of the collector tube 55 through which the secondary coolant enters. The secondary coolant is collected and returned through a common drain manifold at 57.

In addition to the overhead structural support members 25, 26, 28 and 30, it is desirable to provide spacing along the vertical edges of the module pockets and widthwise tension to alleviate wrinkling of the sheets, allowing for expansion and contraction of the sheets under changing conditions of temperature and humidity. As seen best in FIGS. 6 and 7, side-edge support and spacing is provided by an I-Beam-shaped ladder 60 having cut-outs in the web of the beam (as seen in FIG. 14) to permit air to flow from one end to the other, crosswise of the falling coolant. The two vertical edges of each pocket are slidingly positioned between the flat sides of the beam-shaped ladder 60 so as to provide for slight vertical movement of the pocket sheets in response to atmospheric condition changes. A fastening clip 63 comprising two elongated strips having beveled edges on one side is placed over the extreme edge of the sheets 10 and 11 and is riveted together so as to be securely attached to the pair of sheets. The beveled edges of the clip-forming strips cooperate to form a "V" groove in one longitudinal edge of the clip which has a complimentary vertically sliding fit with the pointed edge formed by the side-by-side ends of two adjoining beam ladders 60. The ladders 60 are not attached to other structure at their top and bottom ends and derive their ability to place widthwise tension on the sheets 10 and 11 through the use of a stress bar 64 whose ends are carried in cooperating apertures 65 in the web of the beam ladder 60. As seen in FIG. 7, each end of the bar 64 carries a spring 66 which is normally compressed so as to exert an outward biasing force on the two opposed ladders at opposite ends of the air duct in which the stress bar is positioned. Collars 67 are attached to the bar to provide a force base for each of the springs 66. The action of the springs 66 on each end of the bar 64 keeps the ladders forced apart and the sheets 10 and 11 in tension across their width. Vertical tension is maintained in the sheets by the weight of the sheets and the collector 14. A mid-point ladder 69 may be desirable to stabilize the stress bar. Positioned along the stress bar 64 are a plurality of standoffs 70. Each standoff consists of a central web 71 having an aperture through which the bar 64 passes and a pair of mutually parallel discs 73 carried by and perpendicular to the web. The face of each disc 73 bears lightly against the sheets 10 and 11 of adjoining pockets to provide stabilization for the pockets.

We claim:

1. A heat exchanger comprising in combination:
    at least one enclosure comprising two substantially parallel flexile and wettable sheet sidewalls sealed together along their vertical edges and open along their top and bottom edges and disposed sufficiently proximate to each other to create capillary attraction between the sheets when a liquid is introduced therebetween;
    means suspending the enclosure;
    a liquid carrying header disposed above the top edge opening in the enclosure and having means for dispensing liquid into the enclosure; and
    means passing a fluid across the outside surface of at least one of the sidewalls of the enclosure in heat exchange relation with the liquid within the enclosure.

2. The heat exchanger of claim 1 and further including at least one second liquid carrying header positioned proximate to one of the said wettable sheet sidewalls and having means for dispensing said second liquid as a film on the outside surface of the said sidewall.

3. The heat exchanger of claim 1 and further including liquid collector means disposed along the bottom edge of the enclosure.

4. The combination of claim 3 wherein the said header and collector means each comprise an elongated hollow conduit of generally wedge-shaped vertical cross-section with one tapered edge extending longitudinally thereof and wherein the tapered edges of the header and collector conduits are disposed within the top and bottom edges respectively of the said enclosure in sealing engagement therewith and wherein the tapered edges of the header and collector conduits have apertures to permit the passage of liquid therethrough.

5. The combination of claim 4 wherein the header and collector conduits are symmetrical in vertical cross-section about their vertical center lines.

6. The heat exchanger of claim 5 including a plurality of said enclosures, each having their respective header and collector conduits, and wherein the said headers and collectors are disposed in mutually parallel side-by-side proximate relationship forming open "V" shaped troughs therebetween, wherein the width of each trough defines a duct space between the mutually parallel adjoining enclosures for the free flowing passage of gas.

7. The combination of claim 6 and further including a plurality of second liquid carrying headers each of generally wedge-shaped vertical cross-section and having a top forming tapered edge portion longitudinally thereof which edge portion is complimentarily disposed within the said "V" shaped troughs between the first liquid headers and wherein the said second liquid headers each have apertures spaced along the bottom edge portion thereof for dispensing the liquid therein.

8. The combination of claim 7 and further including flexible flap means attached to the bottom edge of each of said second liquid headers, draping therefrom in substantial inverted "U" shape and depending in close proximity to the sidewalls of adjoining first liquid carrying enclosures.

9. The combination of claim 8 and further including second liquid collector means disposed proximate the bottom edge of each of said enclosure within the gas duct space between adjoining enclosures.

10. The combination of claim 9 and further including first liquid and second liquid manifold means interconnected to the first liquid and second liquid headers respectively.

11. The combination of claim 9 wherein each of second liquid collector means comprise an elongated hollow conduit of generally wedge-shaped vertical cross-section having a bottom forming tapered edge portion longitudinally thereof which edge portion is complimentarily disposed with the said "V" shaped troughs between the first liquid collectors and wherein each of said second liquid collector conduits have openings in the upper edge thereof for the passage of liquid thereinto.

12. The combination of claim 11 and further including a plurality of spacer beams each comprising a pair of opposed flanges interconnected by a web and wherein the beams are disposed vertically between the said enclosure, the said beam flanges bearing against the sidewalls of adjoining enclosures in sliding relation therewith and wherein the web of each of said spacer beam is relieved to provide openings for the passage of gas through the said gas ducts.

13. The combination of claim 12 and further including clip means fastened to the vertical side edges of each of said enclosures, said clip means being carried by and in sliding engagement with the cooperating flanges of adjoining spacer beams.

14. The combination of claim 13 and further including a plurality of tensioning means disposed horizontally within the said air ducts and carried by the webs of the said spacer beams to bias apart the beams and clip means and provide horizontal tension to each of the enclosures.

15. In a heat exchanger of the type having vertically disposed heat exchange surfaces cooperating with top and bottom manifolds to define an open-ended box-like structure adapted to pass a horizontally-directed flow of air therethrough; hot liquid coolant distribution means located at the top of the structure connectable to a source of coolant, secondary coolant distribution means located at the top of the shell connectable to a source of secondary coolant, coolant collection means in the bottom of the shell positioned and adapted to receive the coolant introduced therein and return same to the source, secondary coolant collection means in the bottom of the shell position and adapted to receive the secondary coolant introduced therein and keep it separate from the coolant direct to a collection basin for recirculation, and means for directing a flow of air through the shell from one end to the other, an improved self pressure equalizing heat transfer assembly which comprises:
    a plurality of hanging flexible pockets arranged in longitudinally-extending side-by-side mutually-spaced relation so as to leave air passages for the flow of air therebetween, each of said pockets including a pair of flexible wettable sheets cooperating to define a plurality of vertically-disposed coolant flow passages extending from top to bottom thereof, said pair of sheets being so closely spaced to each other as to allow the formation of a liquid capillary bond therebetween, the upper end of said pockets being connected to receive hot liquid coolant from the coolant distribution means and distribute same in the form of a thin film into the coolant pocket, said sheets freely flexing under the influence of the enclosed liquid thus introduced while cooperating therewith to establish an equal pressure condition inside and outside of each pocket at all unrestrained points on the surface thereof, the lower end of said pockets being connected to discharge the coolant film into the collection means therefor, and the exterior surfaces of said pockets being positioned to receive secondary coolant delivered thereto from the secondary coolant distribution means and pass same in cocurrent flow heat exchange relation to the hot coolant flowing inside thereof before entering the secondary coolant.

* * * * *